United States Patent Office 3,364,229
Patented Jan. 16, 1968

3,364,229
1,4 DITHIIN-2,3,5,6-TETRACARBOXIMIDES AND PROCESS FOR THEIR PREPARATION
Wilfried Draber, Ippendorf, and Friedrich W. A. G. K. Korte, Hangelar, Germany, assignors to Shell Oil Company, New York, N.Y., a corporation of Delaware
No Drawing. Filed Jan. 21, 1965, Ser. No. 427,117
Claims priority, application Germany, Jan. 30, 1964, S 89,287
14 Claims. (Cl. 260—326.3)

ABSTRACT OF THE DISCLOSURE

Novel 1,4-dithiin-2,3,5,6-tetracarboximides, such as N,N'-dimethyl-1,4-dithiin-2,3,5,6-tetracarboxylic acid diimide, useful as anthelmintics and processes for preparing same.

This invention relates to novel substituted dithiin-tetracarboxdiimides. In particular the invention pertains to a novel class of N-substituted dithiin-tetracarboxdiimides and to a novel method for their preparation.

The unsubstituted dithiin-tetracarboxdiimide is known in the art and a method for its preparation has been described in U.S. Patent 3,053,853. An alternate synthesis route has now been discovered which permits the preparation of the biologically active N-substituted dithiin-tetracarboxdiimides. Such substituted dithiins have been found to be useful anthelmintics for the control of internal parasites of animals, especially nematodes, and to have insecticidal activity as well.

The novel dithiins have been synthesized in good yields from a readily available material and provide a valuable class of chemotherapeutic agents. Since substituted dithiins prepared according to the method of the above-cited patent are sensitive towards bases, alkylation or hydroxymethylation by conventional methods was not possible without decomposition. As a consequence, they are most effectively prepared by the process described herein.

The compounds of the invention are certain N,N'-disubstituted 1,4-dithiin-2,3,5,6-tetracarboximides, wherein each substituent is selected from the group consisting of hydrocarbyl, halohydrocarbyl, hydroxyhydrocarbyl and acetoxyhydrocarbyl, in which each hydrocarbyl group has up to 20 carbon atoms.

These compounds are represented by the structural formula

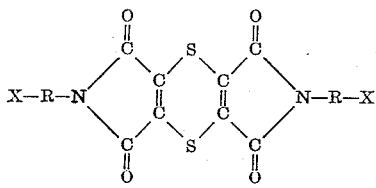

wherein each R is a hydrocarbylene radical of up to 20 carbon atoms, and each X is a monovalent radical selected from the group consisting of hydrogen, chlorine, bromine, hydroxy and acetoxy radicals. Both X's can be the same, or they can be different. By "hydrocarbylene" is meant the radical obtained by removing two hydrogen atoms from a hydrocarbon radical.

Representative N-substituted dithiin tetracarboxiimides include, for example:

N,N'-diethyl-1,4-dithiin-2,3,5,6-tetracarboxylic acid diimide
N,N'-dipropyl-1,4-dithiin-2,3,5,6-tetracarboxylic acid diimide
N,N'-dihexyl-1,4-dithiin-2,3,5,6-tetracarboxylic acid diimide
N-methyl-1,4-dithiin-2,3,5,6-tetracarboxylic acid diimide
N-methyl,N'-phenyl-1,4-dithiin-2,3,5,6-tetracarboxylic acid diimide
N-methyl,N'-chloromethyl-1,4-dithiin-2,3,5,6-tetracarboxylic acid diimide
N,N'-bis-(1,2-dichloroethyl)-1,4-dithiin-2,3,5,6-tetracarboxylic acid diimide
N,N'-bis-(hydroxymethyl)-1,4-dithiin-2,3,5,6-tetracarboxylic acid diimide
N,N'-bis(acetoxyphenyl)-1,4-dithiin-2,3,5,6-tetracarboxylic acid diimide
N,N'-dinaphthyl-1,4-dithiin-2,3,5,6-tetracarboxylic acid diimide
N,N'-ditolyl-1,4,-dithiin-2,3,5,6-tetracarboxylic acid diimide
N,N'-bis-(bromomethyl)-1,4-dithiin-2,3,5,6-tetracarboxylic acid diimide
N,N'-bis-(chloropentyl)-1,4-dithiin-2,3,5,6-tetracarboxylic acid diimide
N,N'-bis-(chloropheny)-1,4-dithiin-2,3,5,6-tetracarboxylic acid diimide
N,N'-bis-(dichloronaphthyl)-1,4-dithiin-2,3,5,6-tetracarboxylic acid diimide
N,N'-bis-(chloromethylphenyl)-1,4-dithiin-2,3,5,6-tetracarboxylic acid diimide
N,N'-bis-(hydroxybutyl)-1,4-dithiin-2,3,5,6-tetracarboxylic acid diimide
N,N'-bis-(hydroxyphenyl-1,4-dithiin-2,3,5,6-tetracarboxylic acid diimide
N,N'-bis-(acetoxybutyl)-1,4-dithiin-2,3,5,6-tetracarboxylic acid diimide Particularly preferred because of their outstanding biological activity are the N,N'-alkyl and substituted-alkyl 1,4-dithiin-2,3,5,6-tetracarboxylic acid diimides wherein each substituent has up to three carbon atoms in the alkyl moiety. These compounds are represented by the structural formula:

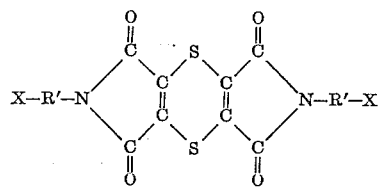

wherein each R' is alkylene of up to 3 carbon atoms and X is a monovalent radical selected from the group consisting of hydrogen, bromine, chlorine, hydroxy, and acetoxy radicals. Typical of these compounds are:

N,N'-dimethyl-1,4-dithiin-2,3,5,6-tetracarboxylic acid diimide
N,N'-diethyl-1,4-dithiin-2,3,5,6-tetracarboxylic acid diimide
N,N'-diisopropyl-1,4-dithiin-2,3,5,6-tetracarboxylic acid diimide
N,N'-bis-(chloromethyl)-1,4-dithiin-2,3,5,6-tetracarboxylic acid diimide
N,N'-bis-(chloroethyl)-1,4-dithiin-2,3,5,6-tetracarboxylic acid diimide
N,N'-bis-(hydroxymethyl)-1,4-dithiin-2,3,5,6-tetracarboxylic acid diimide
N,N'-bis-(acetoxymethyl)-1,4-dithiin-2,3,5,6-tetracarboxylic acid diimide Of these, the most preferred for anthelmintic uses are the N.N' - dialkyl-1,4-dithiin-2,3,5,6-tetracarboxylic acid diimides wherein each alkyl group contains from 1 to 3 carbon atoms. N,N' - dimethyl-1,4-dithiin-2,3,5,6-tetracarboxylic acid diimide is one such compound.

The compounds of the invention are prepared by reacting an N-substituted 1,2-dihalomaleic acid imide with a compound capable of releasing free sulfur under the reaction conditions in liquid phase, at a temperature of from about 10° C. to 150° C.

The N-substituted 1,2-dihalo maleic acid imide reactants are represented by the formula:

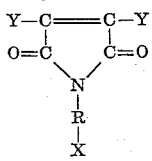

wherein each Y is chlorine or bromine and R and X have the meaning hereinbefore set out.

Suitable sulfur generators include hydrogen sulfide, alkali metal sulfides, such as sodium and potassium sulfide, alkaline earth sulfides such as barium and calcium sulfide, trithiocarbonates, thiosulfates, thiourea, thiosemicarbazide, thioacetamide, or polysulfides (mixture of lime and sulfur).

The general reaction scheme of the process of the invention may be summarized as follows:

(1) The dichloromaleimide is prepared by photochlorination of succinimide which is obtained from carbonylation of acrylamide

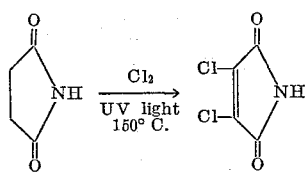

The double bond of dichloromaleimide is extremely photoactive towards other double bonds and the chlorine atoms can be replaced by sulfur to form new ring systems.

(2) The hydrogen of the NH moiety or the dichloromaleimide can readily be replaced with R—X where R and X are as previously defined.

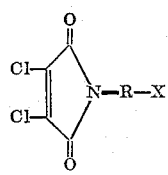

(3) When the sulfur donor is added to the N-substituted dichloromaleimide, a dithiin ring system is formed.

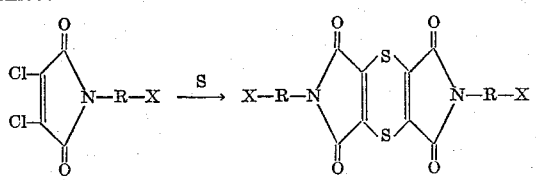

Dihalomaleic acid imide used as starting material, in particular dichloromaleic acid imide, is suitably prepared by chlorination of succinic acid imide at 100–200° C., as described by Ciamician et al., in Chem. Ber. 16, 2394 and Chem. Ber. 17, 553. It has been found that the yield in dichloromaleic acid imide can be considerably increased by photochemical excitation of the reaction, especially by using light with a wavelength from 3,000 A. to 7,000 A.

The reaction of the invention is of particular importance for the preparation of N-substituted dithiins. These compounds cannot be readily obtained by the method of the prior art.

N-substituted dihalomaleic acid imides containing a substituted alkyl, aryl or aralkyl group bonded to the nitrogen atom are used as starting materials. Examples of such starting materials are the following: N-(hydroxymethyl)-dichloromaleic acid imide, N-(chloromethyl)-dichloromaleic acid imide, N-(acetoxymethyl)-dichloromaleic acid imide, N-[O,O-diethylthiophosphorylmethyl]-dichloromaleic acid imide, N-ethyl-dibromomaleic acid imide, dichloromaleic acide anilide, dichloromaleic acid p-tolylimide, and chloro-bromomaleic acid methylimide, N-(trichloromethylthio)-dichloromaleic acid imide, N-carbethoxy-dibromomaleic acid imide, N-carbamoyl-dichloromaleic acid imide. The alkyl, aryl or aralkyl groups bonded to the nitrogen atoms may be substituted by one or several hydroxy groups, halogen atoms, ether groups, amino groups, acyl groups or acyloxy groups. Preferred starting materials are dichloromaleic acid methylimide, dichloromaleic acid benzylimide, N-(hydroxymethyl)-dichloromaleic acid imide, N-(acetoxymethyl)-dichloromaleic acid imide, N-(methoxymethyl)-dichloromaleic acid imide and N-(chloromethyl)-dichloromaleic acid imide.

When hydrogen sulfide is used (preferred because of its low cost) as the sulfur-containing starting material, the use of an acid-binding reagent is desirable. The formation of a basic reaction medium is to be avoided so that the forming dithiin does not decompose. A suitable reagent is calcium carbonate or bicarbonate, pyridine, sodium hydroxide, trimethylamine, and similar compounds. Good results were obtained with calcium carbonate. It is of advantage to continuously add the acid-binding reagent during the reaction or to add it in relatively small amounts. The dosage is suitably chosen in such a way that the pH of the reaction mixture does not rise beyond 7.

The reaction with $H_2S$ can be carried out at room temperature, as well as at increased temperatures, for instance at 50–70° C. Since the forming dithiins are thermally rather stable compounds, temperatures up to 150° C. can be used if desired, although this would not result in any advantages. Even when alkali and alkaline earth sulfides are used, temperatures from 10 to 150° C. may be employed. When sodium thiosulfate, trithiocarbonate, thiourea, thiosemicarbazide, or thioacetamide is used as sulfur-yielding compound, an increase in the reaction temperature up to 50–100° C. is desirable.

A mixture of water and a lower alcohol, such as for instance methanol, ethanol, or isopropanol is suitable as reaction medium. Likewise, acetone/water mixtures are suitable. When $H_2S$ is used as the sulfur-donor, it is possible to work in a water-free medium. When thiourea is used in an anhydrous medium, the bis-isothiouronium salts of a maleic imide are first obtained at temperatures between 0 and 20° C.; these compounds react at increased temperatures between 50 and 100° C. with water to yield the dithiins.

In general, the dihalomaleic acid imide and the sulfur-yielding compound are used in stoichiometric amounts, that is per mole dihalomaleic acid imide ½–2 moles, preferably approximately 1 mole, of the sulfur-yielding compound is added.

The compounds of the invention are valuable anthelmintics. Furthermore it has been found that the compounds are also active toward red spiders, aphids and mosquito larvae.

The following examples are included to illustrate how certain specific compounds of the invention are prepared and should not be interpreted as limiting the scope of the invention. In the following examples, the quantity of reactants are expressed in parts by weight unless otherwise noted.

*Example 1.—Preparation of dichloromaleic acid benzylimide*

(a) 4950 parts of succinimide (recrystallized from ethanol, M.P. 124° C., absolutely dry) was warmed to 140° C. in a 5-liter flask. A chlorine current was led into the flask at a rate of approximately 500 parts/hour with agitation and irradiation by Philips Photolita SM lamps. The theoretically required amount of chlorine was 150 moles; however a small portion was lost in the form of evolving hydrogen chloride so that up to 50% excess chlorine was introduced into the flask. This excess can be recovered, if desired, by condensation and fractionation of the evolved gas. The reaction is completed after approximately 25 hours. Toward the end of the reaction, the melting point rose which was indicated by crystallizing dichloromaleic acid imide closely above the surface of the liquid phase. After approximately 15 hours, the temperature was slowly raised to 150° C. The reaction was completed when no additional dichlorine was taken up. The hot melt was poured out of the flask and crystallized from 5000 parts of volume of ethanol. A larger amount of product was still obtained from the mother liquor by evaporation. For additional purification, the product was recrystallized from ethanol/water under addition of active charcoal. The pure dichloromaleic acid imide was colorless and melted at 180° C. Approximately 5000 parts of pure product was obtained. Yield: 60%.

(b) 581 parts of dichloromaleic acid imide and 441.4 parts dimethyl sulfate were dissolved in 2500 parts by volume anhydrous methanol. The mixture was cooled on ice and a solution of 140 parts potassium in 1000 parts by volume ethanol was added dropwise over a period of 4½ hours. The temperature of the reaction mixture was kept between 5 and 10° C. Subsequently, the mixture was stirred for 3 hours and let stand overnight at room temperature. The precipitate was filtered off. The methanolic filtrate was concentrated in a rotary evaporator until a semi-liquid crystalline paste was obtained. To this ice water was added and the mixture poured over a suction filter. The combined remainders were washed with water, dried and recrystallized from as a small an amount of ethanol as possible. Yield: 481 parts (76%) dichloromaleic acid methylimide, M.P. 85–86° C.

(c) 41.5 parts of dichloromaleic acid imide (0.25 mole) was dissolved in 250 parts by volume anhydrous methanol. To this was added at 0° C. a solution containing 44.8 parts potassium tert-butylate (0.25 mole) in 100 parts by volume ethanol. The mixture was stirred for 3.5 hours at 0° C. and subsequently 200 parts by volume ether was added. The precipitate was separated by suction filtration. By adding ether to the concentrated (by evaporation) filtrate, an additional amount of the potassium salt of dichloromaleic acid imide was obtained. Overall yield: 51.2 parts=100%. 51.2 parts of this salt was dissolved in 350 parts by volume of a dimethylformamide/acetonitrile mixture (3:1) and 43.3 parts benzyl bromide (0.25 mole) was added dropwise, cooling the mixture with ice. The mixture was stirred for 4 hours at 0° C. and subsequently let stand at room temperature for 5–6 hours and then evaporated to about one half of its volume in a rotary evaporator. Subsequently enough ice was added until crystals separated out; the mixture was diluted with 500 parts by volume water and separated by suction filtration. The filter residue was washed with water, dried, and recrystallized from isopropanol. Yield: 56 parts of dichloromaleic acid benzylimide, M.P. 110–112° C.

*Example II.—Preparation of 1,4-dithiin-2,3,5,6-tetracarboxylic acid diimide*

83 parts of dichloromaleic acid imide (0.5 mole) was dissolved in 1000 parts by volume anhydrous methanol containing precipitated, dry calcium carbonate. Exactly one mole hydrogen sulfide was then added, under vigorous agitation, at such a rate that it was entirely absorbed. The mixture was subsequently cooled, filtered off, washed with water, the remainder suspended in water and sufficient hydrochloric acid added that the complete amount of calcium carbonate present dissolved. The compound remained in form of dark olive-green to black crystals which are insoluble in water, ethanol, ether, and most organic solvents. Yield: 51 parts (80%) of 1,4-dithiin-2,3,5,6-tetracarboxylic acid diimide. Melting point >300° C. (decomposition). Elemental analysis (percent by weight): Calculated for $C_8H_2O_4S_2N_2$: C, 37.7; H, 0.8; N, 11.0; S, 25.2. Found: C, 38.2; H, 1.0; N, 10.7; S, 25.1.

*Example III.—Preparation of 1,4-dithiin-2,3,5,6-tetracarboxylic acid diimide*

16.6 parts of dichloromaleic acid imide (0.1 mole) was dissolved in 100 parts of volume ethanol and 7.6 parts (0.1 mole) of thiourea was dissolved in 100 parts by volume of water. Both solutions were warmed to 60° C. and mixed. The initially homogeneous mixture turned orange and rapidly became dark. After a short period of time, the dithiin precipitated out in form of olive-green leaflets. The mixtures was let stand for 2 hours and then filtered by suction. Yield: 9.0 parts (71%) of 1,4-dithiin-2,3,5,6-tetracarboxylic acid diimide.

*Example IV.—Preparation of N,N'-bis-(hydroxymethyl)-1,4-dithiin-2,3,5,6-tetracarboxylic acid diimide*

48.5 parts dichloro - N - (hydroxymethyl)maleimide (0.25 mole) was dissolved in 500 parts by volume anhydrous methanol and treated with dry calcium carbonate. With stirring, 0.5 mole hydrogen sulfide was added at 55–60° C. The warm solution was filtered, let cool, and 500 parts by volume water was added dropwise to the filtrate. The dithiin crystallized in form of fine, green crystals which were filtered off and thoroughly washed with water. The remainder of the filtrate consisted mainly of calcium carbonate and contained only a small amount of the dithiin which was recovered by addition of hydrochloric acid suction filtration. Overall yield: 23.5 parts (60%) of N,N-bis-(hydroxymethyl)-1,4-dithiin-2,3,5,6-tetracarboxylic acid diimide. Melting point >230° C. (decomposition). Elemental analysis (percent by weight): Calculated for $C_{10}H_6O_6S_2N_2$: C, 38.2; H, 1.9; N, 8.9; S, 20.4. Found: C, 37.8; H, 2.4; N, 9.0; S, 20.2.

*Example V*

By a method similar to that described in Example II, N,N'-bis-(chloromethyl) - 1,4 - dithiin - 2,3,5,6 - tetracarboxylic acid diimide was prepared from N-(dichloromethyl)-dichloromaleic acid imide and $H_2S$ in a yield of 80%. Elemental analysis (percent by weight).—Calculated for $C_{10}H_4O_4S_2N_2Cl_2$: N, 8.0; S, 18.2; Cl, 20.1. Found: N, 8.4; S, 18.1; Cl, 19.7.

*Example VI*

By a method similar to that described in Example II, N,N'-bis-(acetoxymethyl) - 1,4 - dithiin - 2,3,5,6-tetracarboxylic acid diimide was obtained from N-(acetoxymethyl)-dichloromaleic acid imide and $H_2S$ in 70% yield; melting point 237° C. Elemental analysis (percent by weight).—Calculated for $C_{14}H_{10}N_2O_8S_2$: C, 42.2; H, 2.5; N, 7.1; S, 16.1. Found: C, 42.2; H, 3.0; N, 7.5; S, 15.8.

*Example VII*

By a method similar to that described in Example III, N,N'-dimethyl-1,4-dithiin-2,3,5,6-tetracarboxylic acid diimide was obtained from N-methyl-dichloromaleimide and thiourea in a 57% yield, melting point 263–5° C. (decomposition). Elemental analysis (percent by weight).—Calculated for $C_{10}H_6N_2O_4S_2$: C, 42.5; H, 2.1; N, 9.9; S, 22.7. Found: C, 42.9; H, 2.3; N, 9.6; S, 22.7.

*Example VIII*

Likewise, N,N'-dibenzyl-1,4-dithiin-2,3,5,6-tetracarboxylic acid diimide was prepared in a similar way from N-benzyl-dichloromaleimide and thiourea in 72% yield. Melting point 224° C. Elemental analysis (percent by weight).—Calculated for $C_{22}H_{14}N_2O_4S_2$: C, 60.9; H, 3.2; N, 6.5; S, 14.8. Found: C, 61.4; H, 3.5; N, 6.8; S, 15.0.

Example IX (a) 16.6 parts of dichloromaleimide (0.1 mole) was dissolved in 100 parts by volume ethanol and 24.8 parts (0.1 mole) $Na_2S_2O_3 \cdot 5H_2O$ was dissolved in 100 parts by volume $H_2O$. Both solutions were warmed to 70–80° C. and combined. The resulting mixture was stirred for one hour at 80° C., let cool, and filtered. Yield: 8.5 parts (68%) of 1,4-dithiin-2,3,5,6-tetracarboxylic acid imide.

(b) When in place of sodium thiosulfate, thioacetamide or thiosemicarbazide, respectively, was used in an otherwise analogous reaction, 1,4-dithiin-2,3,5,6-tetracarboxylic acid diimide was obtained in a 65% or 75% yield, respectively.

Example X (a) 8.4 parts of dichloromaleimide (0.05 mole) was dissolved in 50 parts by volume ethanol and this solution was added, under nitrogen, to a suspension of 24.5 parts barium trithiocarbonate in 100 parts of water. When warmed to 80° C. and stirred, a deep red solution was gradually obtained. This solution was let cool to room temperature and, with stirring, a solution of 8.4 parts dichloromaleimide in 50 parts by volume ethanol was added dropwise. The mixture was stirred for one hour and finally filtered. Yield: 9.5 parts (76%) of 1,4-dithiin-2,3,5,6-tetracarboxylic acid diimide.

(b) When sodium sulfide was used instead of barium trithiocarbonate the dithiin was obtained in 68% yield.

Example XI (a) 9.0 parts of N-methyl-dichloromaleimide (0.05 mole) was dissolved in 100 parts by volume anhydrous methanol. Subsequently, at 2–3° C., 7.6 parts thiourea (0.10 mole) in 100 parts by volume methanol was added dropwise. A part of the product precipitated immediately from the yellow solution; this part was filtered off. 200 parts by volume of ice-cold ether was added to the filtrate. The precipitate was filtered off. Both precipitates were combined and washed with a small amount of methanol and subsequently with ether. When the work was quickly done, the salts were obtained in pure form. Small amounts could be further purified by dissolving in methanol and precipitating with ether. Yield: 15.4 parts (93%) of bis(isothiouronium chloride) salt of N-methyldichloromaleimide. Melting point 168° C. (decomposition). Elemental analysis (percent by weight).—Calculated for $C_7H_{11}N_5O_2S_2Cl_2$: C, 25.3; H, 3.3; N, 21.1; S, 19.3; Cl, 21.4. Found: C, 25.4; H, 3.9; N, 21.3; S, 18.9; Cl, 19.7.

(b) Ten parts (0.03 mole) of the chloride were dissolved in 80 parts of water and warmed to 80–90° C. for two hours. The forming N,N'-dimethyl-1,4-dithiin-2,3,5,6-tetracarboxylic acid diimide precipitated out gradually. After cooling, it was filtered off and washed with water. Yield: 75%.

(c) In a similar way as described under (a), the bis (isothiouronium salts) of the following dichloromaleimides were prepared.

(1) of dichloromaleimide, yield 61%, melting point >140° (decomposition)
(2) of N-hydroxymethyl-dichloromaleimide, yield 70%, melting point >135° (decomposition), and
(3) of dichloromaleic acid benzylimide, yield 51%, melting point >160° (decomposition)

(d) In a similar way as described under (b), these salts [(c) (1), (2), and (3)] could be transformed into the corresponding dithiins by treatment with water.

We claim as our invention:

1. N,N' - dimethyl-1,4-dithiin-2,3,5,6 - tetracarboxylic acid diimide.
2. N,N'-bis - (chloromethyl) -1,4-dithiin-2,3,5,6-tetracarboxylic acid diimide.
3. N,N' - bis-(hydroxymethyl)-1,4-dithiin-2,3,5,6-tetracarboxylic acid diimide.
4. N,N' - bis-(acetoxymethyl)-1,4-dithiin-2,3,5,6-tetracarboxylic acid diimide.
5. A process for the preparation of a compound of the formula

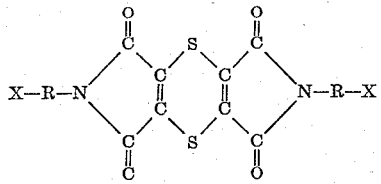

wherein R is alkylene of 1–6 carbon atoms or arylene of 6 to 10 carbon atoms and X is hydrogen, chlorine, bromine, hydroxy or acetoxy, comprising reacting a dichloromaleimide of the formula

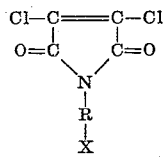

wherein R and X are as hereinbefore defined, in liquid phase at a temperature of from about 10° C. to 150° C. with a compound capable of releasing sulfur.

6. The process of claim 5 wherein said sulfur releasing compound is hydrogen disulfide.
7. The process of claim 5 wherein R is alkylene of 1–3 carbon atoms.
8. The process of claim 7 wherein said sulfur releasing compound is hydrogen disulfide.
9. A process for the preparation of 1,4-dithiin-2,3,5,6-tetracarboxylic acid diimide comprising reacting dichloromaleic acid imide in liquid phase at a temperature of from about 10° C. to 150° C. with a compound capable of releasing sulfur.
10. The process of claim 9 wherein said sulfur releasing compound is hydrogen disulfide.
11. A compound of the formula

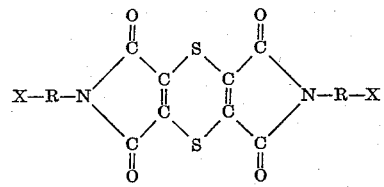

wherein R is alkylene of 1–6 carbon atoms or arylene of 6 to 10 carbon atoms and X is hydrogen, chlorine, bromine, hydroxy or acetoxy.

12. The compound of claim 11 wherein R is alkylene of 1–3 carbon atoms.
13. The compound of claim 12 wherein R is methylene.
14. The compound of claim 12 wherein X is hydrogen.

References Cited

UNITED STATES PATENTS 3,053,853   9/1962   Vest _____ 260—332.2

ALEX MAZEL, *Primary Examiner.*

J. TOVAR, *Assistant Examiner.*